(12) United States Patent
Zhang et al.

(10) Patent No.: US 10,230,781 B2
(45) Date of Patent: Mar. 12, 2019

(54) CLIENT BEHAVIOR CONTROL IN ADAPTIVE STREAMING

(71) Applicant: Futurewei Technologies, Inc., Plano, TX (US)

(72) Inventors: Shaobo Zhang, Shenzhen (CN); Xin Wang, Rancho Palos Verdes, CA (US)

(73) Assignee: Futurewei Technologies, Inc., Plano, TX (US)

( * ) Notice: Subject to any disclaimer, the term of this patent is extended or adjusted under 35 U.S.C. 154(b) by 167 days.

(21) Appl. No.: 14/755,648

(22) Filed: Jun. 30, 2015

(65) Prior Publication Data

US 2016/0006785 A1 Jan. 7, 2016

Related U.S. Application Data

(60) Provisional application No. 62/019,798, filed on Jul. 1, 2014.

(51) Int. Cl.
| | | |
|---|---|---|
| *H04L 29/06* | (2006.01) | |
| *H04N 21/262* | (2011.01) | |
| *H04N 21/442* | (2011.01) | |
| *H04N 21/81* | (2011.01) | |
| *H04N 21/845* | (2011.01) | |

(Continued)

(52) U.S. Cl.
CPC .............. *H04L 65/602* (2013.01); *G09C 1/00* (2013.01); *H04L 65/608* (2013.01); *H04N 21/26258* (2013.01); *H04N 21/44218* (2013.01); *H04N 21/44222* (2013.01); *H04N 21/812* (2013.01);

(Continued)

(58) Field of Classification Search
CPC ..................................................... H04L 65/602
See application file for complete search history.

(56) References Cited

U.S. PATENT DOCUMENTS

2009/0204541 A1* 8/2009 Zhuk ................... H04L 63/0428
705/50
2012/0023254 A1 1/2012 Park et al.
(Continued)

FOREIGN PATENT DOCUMENTS

| CN | 101466024 A | 6/2009 |
|---|---|---|
| CN | 103297464 A | 9/2013 |

(Continued)

OTHER PUBLICATIONS

Foreign Communication From a Counterpart Application, PCT Application No. PCT/US2015/038554, International Search Report dated Dec. 10, 2015, 3 pages.

(Continued)

*Primary Examiner* — Nicholas R Taylor
*Assistant Examiner* — Sanjoy K Roy
(74) *Attorney, Agent, or Firm* — Conley Rose, P.C.

(57) ABSTRACT

A content source comprising a processor configured to generate a media presentation description (MPD) file, wherein the MPD file designates a dependent media content part to be assigned to at least one depended media content part, and wherein the MPD file indicates the dependent media content part is to be accessed by a client device when an access condition for the dependent media content part is satisfied, and a transmitter operably coupled to the processor and configured to transmit the MPD file to at least one of a content server, a control server, and the client device.

19 Claims, 5 Drawing Sheets

(51) Int. Cl.
*H04N 21/854* (2011.01)
*H04N 21/8543* (2011.01)
*G09C 1/00* (2006.01)

(52) U.S. Cl.
CPC ..... *H04N 21/8456* (2013.01); *H04N 21/8543* (2013.01); *H04N 21/85406* (2013.01)

(56) References Cited

U.S. PATENT DOCUMENTS

| | | | | |
|---|---|---|---|---|
| 2013/0031580 A1* | 1/2013 | Keum | ............ | G06Q 30/00 725/32 |
| 2013/0042100 A1* | 2/2013 | Bouazizi | ............ | H04N 21/254 713/151 |
| 2013/0322628 A1 | 12/2013 | Rhyu et al. | | |
| 2014/0013375 A1 | 1/2014 | Giladi | | |
| 2014/0101445 A1 | 4/2014 | Giladi | | |
| 2014/0304515 A1* | 10/2014 | Feuerman | ............ | H04L 63/123 713/176 |
| 2015/0350205 A1* | 12/2015 | Oyman | ............ | H04L 63/126 726/7 |

FOREIGN PATENT DOCUMENTS

| | | | | |
|---|---|---|---|---|
| EP | 2587757 | A1 | 5/2013 | |
| WO | 2013021098 | A1 | 2/2013 | |
| WO | 2014004955 | A1 | 1/2014 | |
| WO | 2014008637 | A1 | 1/2014 | |
| WO | 2014022060 | A1 | 2/2014 | |
| WO | 2014027319 | A1 | 2/2014 | |
| WO | WO 2014090761 A1 * | | 6/2014 | ....... H04N 21/26258 |
| WO | 2015131390 | A1 | 9/2015 | |

OTHER PUBLICATIONS

"Information Technology—Dynamic Adaptive Streaming Over HTTP (DASH)—Part 1: Media Presentation Description and Segment Formats," International Standard, ISO/IEC 23009-1, First Edition, Apr. 1, 2012, 134 pages.

"Information Technology—Generic Coding of Moving Pictures and Associated Audio Information: Systems," International Standard, ISO/IEC 13818-1, Second Edition, Dec. 1, 2000, 174 pages.

Giladi, Ed, et al., "Technologies under Consideration for Dynamic Adaptive Streaming over HTTP 23009, parts 1, 3 and 4," International Organisation for Standarisation, ISO/IED JTC1/SC29, WG11, Coding of Pictures and Audio, ISO/IEC JTC/SC29,WG11 MPEG2014/N15214, Feb. 2015, 32 pages.

Bray, Ed, et al., "Extensible Markup Language (XML) 1.0 (Fifth Edition), W3C Recommendation Nov. 26, 2008," downloaded from the Internet http://www.w3.org/TR/xml/ Apr. 8, 2014, 37 pages.

Machine Translation and Abstract of Chinese Publication No. CN101466024, Jun. 24, 2009, 28 pages.

Machine Translation and Abstract of Chinese Publication No. CN103297464, Sep. 11, 2013, 21 pages.

Foreign Communication From a Counterpart Application, Chinese Application No. 201580016916.9, Chinese Office Action dated Jul. 19, 2018, 6 pages.

Foreign Communication From a Counterpart Application, Chinese Application No. 201580016916.9, Chinese Search Report dated Jul. 11, 2018, 3 pages.

Foreign Communication From a Counterpart Application, European Application No. 15741690.0, European Oral Proceedings dated Oct. 10, 2018, 12 pages.

* cited by examiner

CLIENT BEHAVIOR CONTROL IN ADAPTIVE STREAMING

CROSS-REFERENCE TO RELATED APPLICATIONS

The present application claims benefit of U.S. Provisional Patent Application No. 62/019,798 filed Jul. 1, 2014 by Shaobo Zhang, et al., and entitled, "Method and System for Support of Controlled Playback in Dynamic Adaptive Streaming over HTTP (DASH) When Coding Moving Pictures and Audio," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media content to subscribers or users using different encryption and/or coding schemes suited for different devices (e.g., televisions, laptops, desktop computers, and mobile handsets). The media content provider may support a plurality of media encoders and decoders (codecs), media players, video frame rates, spatial resolutions, bit rates, video formats, or combinations thereof. Media contents may be converted from a source representation to various other representations to suit the different client devices. In adaptive streaming, the client device may dynamically select appropriate representations of the media contents, based on a variety of factors, such as network conditions, device capability, and user choice. The client device may also choose among various adaptation sets of the media contents according to user input, such as for example, enabling or disabling subtitles or selecting a language.

SUMMARY

In one embodiment, the disclosure includes a content source comprising a processor configured to generate a media presentation description (MPD) file, wherein the MPD file designates a dependent media content part to be assigned to at least one depended media content part, and wherein the MPD file indicates the dependent media content part is to be accessed by a client device when an access condition for the dependent media content part is satisfied, and a transmitter operably coupled to the processor and configured to transmit the MPD file to at least one of a content server, a control server, and the client device.

In another embodiment, the disclosure includes a control server comprising a receiver, wherein the receiver is configured to receive an MPD file from one of a content source, a content server, and a client device, wherein the MPD file designates a dependent media content part to be assigned to at least one depended media content part, and wherein the MPD file indicates the dependent media content part is to be accessed by the client device when an access condition for the dependent media content part is satisfied, a decision request from one of the content server and the client device, and at least one access record from the client device, and a processor operably coupled to a memory and the receiver, wherein the memory comprises computer executable instructions stored in a non-transitory computer readable medium such that when executed by the processor causes the processor to make a decision on whether the dependent media content part is to be accessed by the client device based on the MPD file, the decision request, and the at least one access record after receipt of the MPD file, the decision request, and the at least one access record.

In yet another embodiment, the disclosure includes a method implemented by a client device for controlling client behavior in adaptive streaming, the method comprising receiving an MPD file, wherein the MPD file designates a dependent media content part to be assigned to at least one depended media content part, and wherein the MPD file indicates the dependent media content part is to be accessed by the client device when an access condition for the dependent media content part is satisfied, and establishing connections with a content server and a control server following receipt of the MPD file.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
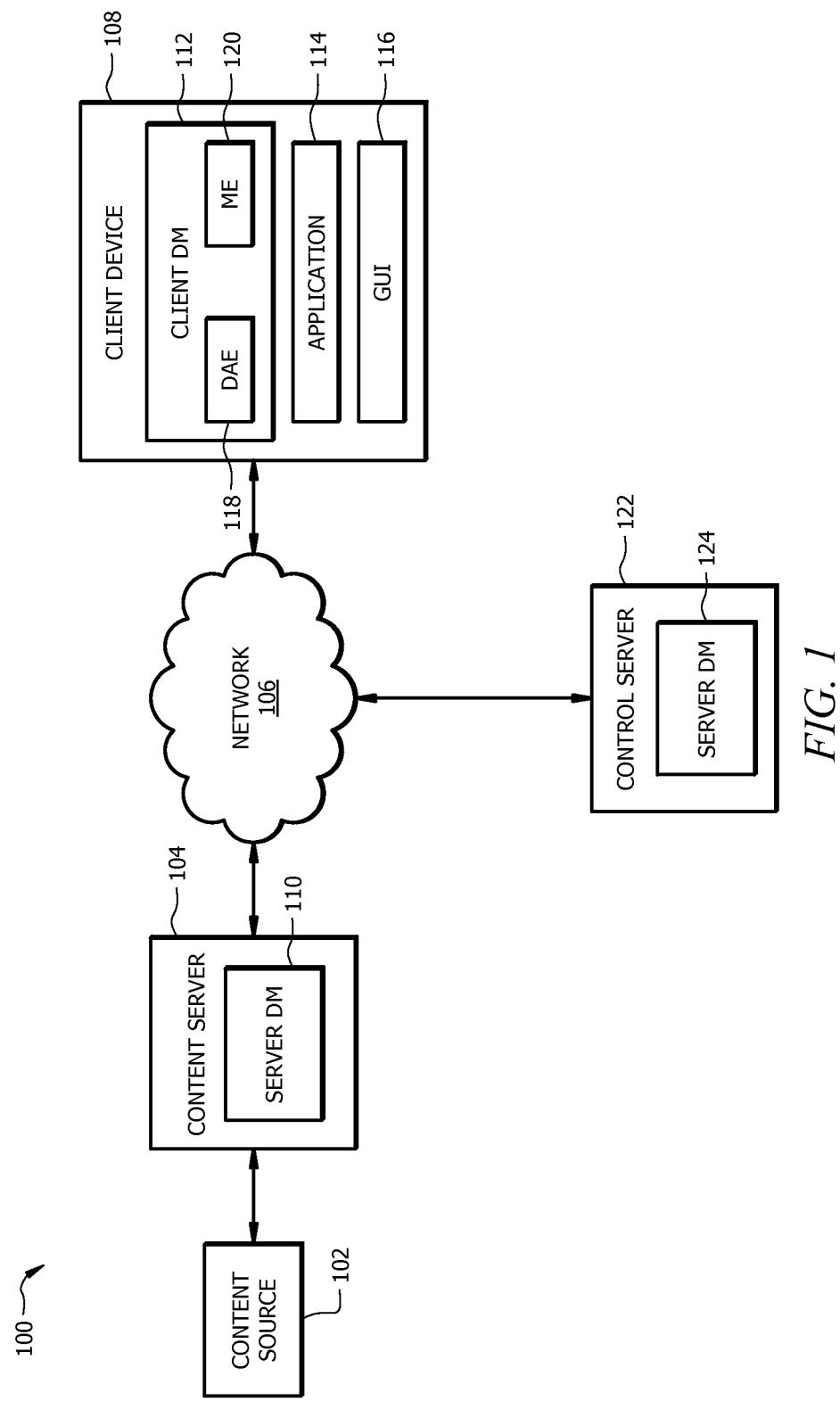
FIG. 1 is a schematic diagram of a dynamic adaptive streaming over hypertext transfer protocol (DASH) system according to an embodiment of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Moving Picture Expert Group (MPEG) has proposed a dynamic adaptive streaming over hypertext transfer protocol (HTTP) (DASH) for adaptive streaming multimedia over a network. The DASH protocol is described in International Organization of Standardization (ISO)/International Electrotechnical Commission (IEC) 13818-1, second edition, published on Dec. 1, 2000, entitled, "Information Technology—Generic Coding of Moving Pictures and Associated Audio Information: Systems," and ISO/IEC 23009-1, fifth edition, published on Apr. 1, 2012, entitled, "Information Technology—Dynamic Adaptive Streaming over HTTP (DASH)—part 1: Media Presentation Description and Segment Formats," which are incorporated herein by reference.

When employing DASH, a media content provider, upon request, transmits a media presentation description (MPD) file to a client. The MPD file is an extensible markup language (XML) document, and describes media content as segments, each of which is defined as a unit of data in ISO/IEC 23009-1. The MPD file also describes how such segments may be utilized to present the media content to a user. For example, the MPD file may describe segment timing, segment multiplexing (e.g., interrelation between audio segment and video segment timings), and uniform resource locator (URL) information indicating where such segments may be obtained. For example, streamed media content may comprise several media components (e.g., audio, video, and text), each having different characteristics specified in the MPD file.

Insertion of advertisements in streaming media presentations has become a major revenue source for media content providers. Therefore, ensuring that client devices present the advertisement along with the streaming media is important. One way to ensure that the advertisement is appropriately presented is through the use of a digital rights management (DRM) system. However, the DRM system is implemented in a closed environment. As such, the client devices are trusted by a content server to follow the content server's instructions without modifying the MPD file. On the contrary, the DASH protocol is typically implemented in an open environment, where the client devices may not follow the content server's instructions and may skip the advertisements easily by modifying the MPD file.

Disclosed herein are various embodiments for client behavior control in adaptive streaming of media content. The media content is comprised of media content parts, each of which comprises one or more segments and may be either a depended media content part or a dependent media content part. In some examples, the dependent media content part depends from the depended media content part. The disclosed embodiments prevent at least a portion of the depended media content parts (e.g., advertisements, copyright claims, payment notices, or warnings) from being skipped by a client device. A content source transmits an MPD file to at least one of a content server, the client device, and a control server. The MPD file designates a dependent media content part to be assigned to at least one depended media content part, and indicates the dependent media content part is to be accessed by the client device when an access condition for the dependent media content part is satisfied. The access condition may have various embodiments. In one embodiment, the access condition for the dependent media content part indicates that the at least one depended media content part has been accessed by the client device before the dependent media content part is allowed to be accessed by the client device. In one embodiment, the access condition for the dependent media content part indicates that a portion of the at least one depended media content part has been accessed by the client device before the dependent media content part is allowed to be accessed by the client device. The control server receives at least one access record of the at least one depended media content part from the client device. After receipt of a decision request from either the client device or the content server, the control server makes a decision on whether the dependent media content part is to be accessed by the client device based on the at least one access record of the at least one depended media content part, the MPD file, and the decision request. In an embodiment, the content server and the control server are two separate servers. In an embodiment, the functions of the content server and the control server are combined in a single server.

FIG. 1 is a schematic diagram of a DASH system 100 according to an embodiment of the disclosure. The DASH system 100 may generally comprise a content source 102, a content server 104, a network 106, one or more client devices 108, and a control server 122. In an embodiment, the content server 104, the client device 108, and the control server 122 may be in communication with each other via the network 106 to, for example, exchange data. Additionally, the content server 104 may be in communication with the content source 102 directly, as shown. In some examples, the content server 104 receives an MPD file and various media content from the content source 102. In an embodiment, the DASH system 100 may further comprise one or more additional content sources 102 and/or content servers 104. It is noted that the use of the term DASH throughout the disclosure may include any adaptive streaming, such as HTTP Live Streaming (HLS), Microsoft Smooth Streaming, or Internet Information Services (IIS), and may not be constrained to represent only third generation partnership (3GP)-DASH or MPEG-DASH.

The content source 102 is a media content provider or distributor configured to deliver various media content to subscribers or users using different encryption and/or coding schemes suited for different devices (e.g., television, laptops, and/or mobile handsets). The content source 102 is configured to support a plurality of media encoders and/or decoders (e.g., codecs), media players, video frame rates, spatial resolutions, bit-rates, video formats, or combinations thereof. Media content may be converted from a source or original presentation to various other representations to suit different users.

The content server 104 is in communication with one or more client devices 108 and the control server 122 via HTTP or another suitable protocol. The content server 104 is configured to store media content (e.g., in a memory or cache) and/or to forward media content segments. Each segment may be encoded in a plurality of bitrates and/or representations. In an embodiment, the content server 104 comprises a server DASH module (DM) 110 configured to send and receive data via HTTP or another suitable protocol. In one embodiment, the content server 104 comprises a network node such as, for example, a computer server or a workstation. In an embodiment, the content server 104 forms a portion of a content delivery network (CDN), which may refer to a distribution system of servers, deployed in multiple data centers over multiple backbones for the purpose of delivering content. A CDN may comprise one or more content servers 104. Although FIG. 1 illustrates a content server 104, other servers such as origin servers, web servers, and/or any other suitable type of server may store media content.

The network 106 comprises any network configured to provide communication (e.g., the exchange of data) between the content server 104, the client device 108, and the control server 122 along wired and/or wireless channels. For example, the network 106 may be the internet or mobile telephone network.

The client device 108 is any network node, for example, a hardware device configured to communicate with the content server 104 and the control server 122 via HTTP or other suitable protocol. A client device 108 may be a laptop, a tablet computer, a desktop computer, a mobile telephone, or any other device. The client device 108 is configured to parse an MPD file to retrieve information regarding the media contents, such as timing of the program, availability of media content, media types, resolutions, minimum and/or maximum bandwidths, existence of various encoded alternatives of media components, accessibility features and required DRM, location of each media component (e.g., audio data segments and video data segments) on the network, and/or other characteristics of the media content. As will be more fully explained below, the client device 108 is also configured to select an appropriate encoded version of the media content according to the information retrieved from the MPD file and to stream the media content by fetching media segments located on the content server 104. A media segment may comprise audio and/or visual samples from the media content.

In an embodiment, the client device 108 comprises a client DM 112, an application 114, and a graphical user interface (GUI) 116. The client DM 112 is configured to send and receive data via HTTP and a DASH protocol (e.g., ISO/IEC 23009-1). The client DM 112 may comprise a DASH access engine (DAE) 118 and a media output (ME) 120. The DAE 118 is configured as the primary component for receiving raw data from the content server 104 (e.g., the server DM 110) and constructing the data into a format for viewing. For example, the DAE 118 may format the data in MPEG container formats along with timing data, then output the formatted data to the ME 120. The ME 120 is responsible for initialization, playback, and other functions associated with the media content and may output that media content to the application 114.

In an embodiment, the application 114 is a web browser or other application with an interface configured to download and present media contents. The application 114 is coupled to the GUI 116 so that a user associated with the client device 108 may view and control the various functions of the application 114. In an embodiment, the application 114 is a media player, which comprises a search bar so that the user is able to input a string of words to search for media content such as a movie. The application 114 presents a list of search hits, and the user may select the desired media content among the hits. Upon selection, the application 114 sends instructions to the client DM 112 for downloading the media content. The client DM 112 downloads the media content and processes the media content for outputting to the application 114. For example, the application 114 may provide instructions to the GUI 116 for the GUI 116 to display a progress bar showing the temporal progress of the media content. The GUI 116 may be any GUI configured to display functions of the application 114 so that the user may operate the application 114. As described above, the GUI 116 may display the various functions of the application 114 so that the user may select content to download. The GUI 116 may then display the media content for viewing by the user.

The control server 122 is in communication with the content server 104 and one or more client devices 108 via HTTP or another suitable protocol (e.g., to permit the exchange of data) and is configured to provide permission to the content server 104 to send the media content to the client device 108. In an embodiment, the control server 122 comprises a server DM 124 configured to send and receive data via HTTP. The server DM 124 is similar to the server DM 110. The control server 122 may be any network node such as a computer server or a workstation. In an embodiment, the control server 122 may form a portion of a CDN, which comprises a plurality of control servers 122. Although FIG. 1 shows the content server 104 and the control server 122 as separate servers, in some embodiments the content server 104 and the control server 122 may be combined in a single server.

Figure 2:
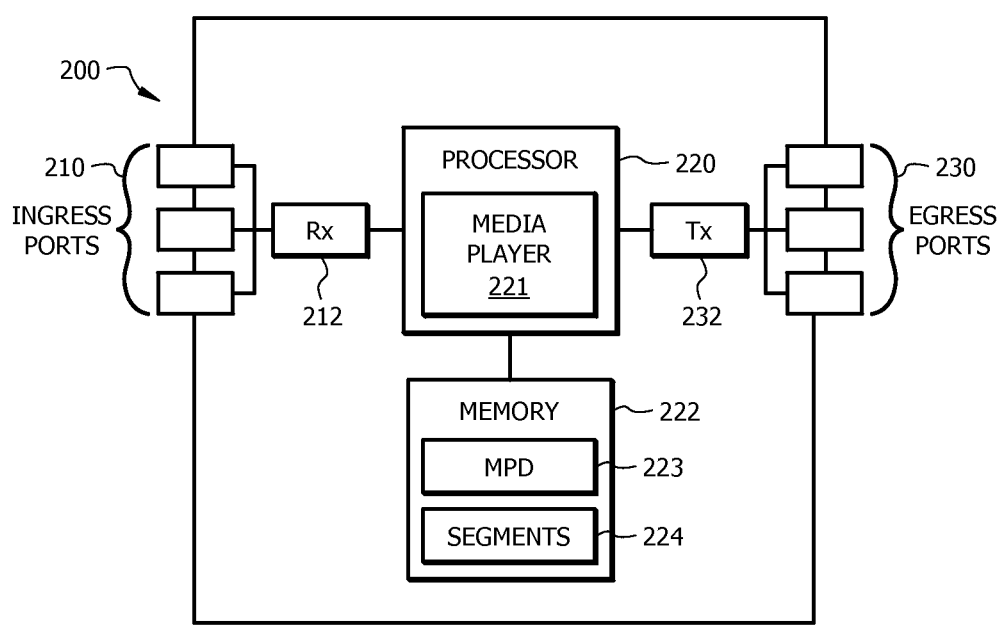
FIG. 2 is a schematic diagram of an embodiment of a network element (NE).

FIG. 2 is a schematic diagram of an embodiment of a network element (NE) 200. The NE 200 may be suitable for implementing the disclosed embodiments. For example, the NE 200 may be any device (e.g., a modem, a switch, router, bridge, server, client, controller, etc.) that transports or assists with transporting data and segments thereof through a network, system, and/or domain. For example, the NE 200 may be in and/or integrated within the content server 104, the client device 108, and the control server 122. The NE 200 comprises one or more ingress ports 210 coupled to a receiver 212 (Rx), which are configured for receiving MPD files and/or segments from other network components. The NE 200 further comprises one or more egress ports 230 coupled to a transmitter (Tx) 232, which are configured for transmitting the MPD files and/or segments to other network components. The NE 200 further comprises a logic unit or processor 220 coupled to the receiver 212 and configured to process the segments or otherwise determine to which network components to send the segments.

The processor 220 may be implemented using hardware or a combination of hardware and software. The processor 220 may be implemented as one or more central processor unit (CPU) chips, cores (e.g., a multi-core processor), field-programmable gate arrays (FPGAs), application specific integrated circuits (ASICs), and/or digital signal processors (DSPs). The processor 220 may be configured to implement a media player 221 or any functional component known by one of ordinary skill in the art, or any combinations thereof. The media player 221 may be an application running on the processor 220 and configured to play decoded media segments.

The NE 200 may further comprise at least one memory 222. The memory 222 may be volatile and non-volatile and may be read-only memory (ROM), random-access memory (RAM), ternary content-addressable memory (TCAM), and static random-access memory (SRAM). The memory 222 may be configured to store MPD files 223 and segments 224. The MPD files 223 and the segments 224 may be stored or packed in various forms as further described below. As shown in FIG. 2, the segments 224 and the MPD files 223 are stored as separate files, but they may also be stored in a single file. In practice, there may be bidirectional traffic processed by the NE 200, thus some ports may both receive and transmit packets (e.g., segments). In this sense, the ingress ports 210 and egress ports 230 may be co-located or may be considered different functionalities of the same ports that are coupled to transceivers (Rx/Tx).

It is understood that, by programming and/or loading executable instructions onto the NE 200, at least one of the processor 220 and the memory 222 can be changed. As a result, the NE 200 may be transformed in part into a particular machine or apparatus (e.g., a network router having the functionality taught by the present disclosure). The executable instructions may be stored on the memory 222 and loaded into the processor 220 for execution.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read only memory (CD-ROM), compact disc recordable (CD-R), compact disc rewritable (CD-R/W), digital versatile disc (DVD), Blu-ray™ disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 3:
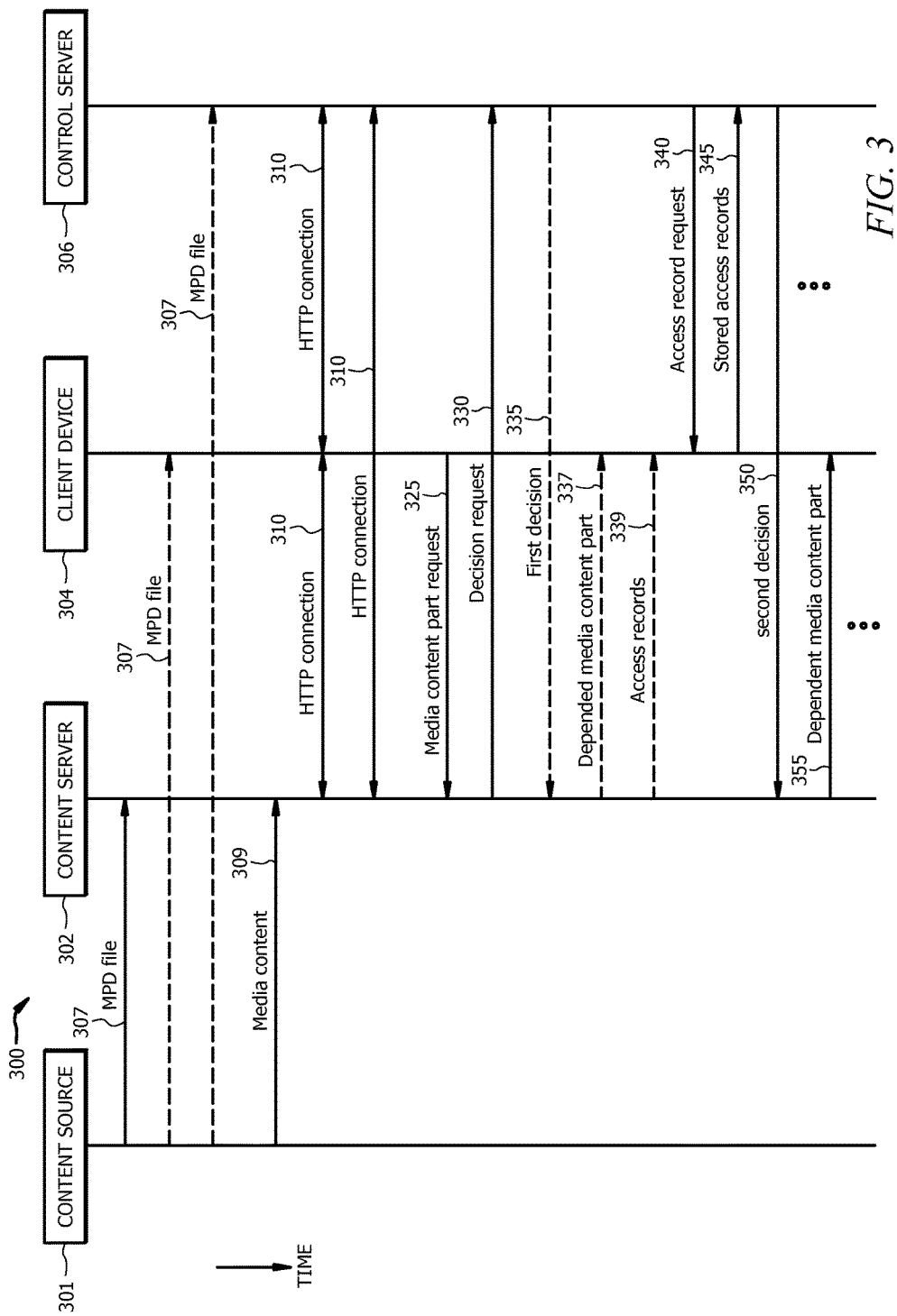
FIG. 3 is a protocol diagram illustrating client behavior control in adaptive streaming according to an embodiment of the disclosure.

FIG. 3 is a protocol diagram 300 illustrating client behavior control in adaptive streaming according to an embodiment of the disclosure. The client behavior control in adaptive streaming shown by the protocol diagram 300 is implemented when a user requests media streaming services. The client behavior control ensures a dependent media content part is accessed by a client device 304 (e.g., the client device 108) when an access condition for the dependent media content part is satisfied. The access condition for the dependent media content part is described in further detail below. The client behavior control in adaptive streaming may be implemented in the DASH system 100. The protocol diagram 300 illustrates message exchanges between a content source 301 (e.g, the content source 102), a content server 302 (e.g., the content server 104), the client device 304 (e.g., the client device 108), and a control server 306 (e.g., the control server 122).

The content source 301 generates an MPD file 307 based on media content 309. The MPD file 307 comprises descriptions about the media content 309 for adaptive streaming. The media content 309 may be a video, an audio, or a text. The media content 309 comprises media content parts, each of which comprises at least one segment. The MPD file 307 designates a dependent media content part to be assigned to at least one depended media content part, and indicates the dependent media content part is to be accessed by the client device 304 when an access condition for the dependent media content part is satisfied.

The access condition for the dependent media content part is defined in the MPD file and may have various embodiments. In an embodiment, the access condition indicates that the at least one depended media content part has been accessed by the client device 304, wherein the depended media content part must be accessed before the dependent media content part is allowed to be accessed by the client device 304. For example, the dependent media content part is an 8-minute Yoga video, which is designated by the MPD file to be assigned to a depended media content part, a 2-minute advertisement. In this case, the 8-minute Yoga video is allowed to be accessed by the client device 304 after the whole 2-minute advertisement has been accessed by the client device 304.

In an embodiment, the access condition for the dependent media content part indicates that a predetermined portion of the at least one depended media content part has been accessed by the client device 304 before the dependent media content part is allowed to be accessed by the client device 304. For example, the predetermined portion of the at least one depended media content part is the first 10-second portion of the 2-minute advertisement designated in the MPD file. In this case, the 8-minute Yoga video is allowed to be accessed by the client device 304 after the first 10-second portion of the 2-minute advertisement has been accessed by the client device 304.

The content source 301 transmits the MPD file 307 to at least one of the content server 302, the client device 304, and the control server 306. In an embodiment, the content source 301 transmits the MPD file 307 to all of the content server 302, the client device 304, and the control server 306. In an embodiment, the content source 301 transmits the MPD file 307 to one of the content server 302, the client device 304, and the control server 306, which subsequently transmits the MPD file 307 to the others. The MPD file 307 may be transmitted via various types of data transport, for example HTTP secure (HTTPS), email, or universal serial bus (USB) drives. The content source 301 further transmits the media content 309 to the content server 302.

The client device 304 establishes HTTP connections 310 with the content server 302 and the control server 306. The client device 304 transmits a media content part request 325 for a media content part to the content server 302. In an embodiment, upon receipt of the media content part request 325, the content server 302 transmits a decision request 330 to the control server 306 to determine whether the media content part should be transmitted from the content server 302 to the client device 304. The control server 306 determines whether the media content part is one of the at least one depended media content part according to the MPD file 307. When the control server 306 determines the media content part is one of the at least one depended media content part, the control server 306 transmits a first decision 335 to the content server 302 indicating a depended media content part 337 is allowed to be transmitted from the content server 302 to the client device 304. The content server 302 then transmits each segment of the depended media content part 337 to the client device 304 in response to the first decision 335. Each segment of the depended media content part 337 is transmitted along with an access record 339. The access record 339 indicates that the segment is transmitted. The client device 304 stores the segments of the depended media content part 337 and the access records 339 upon receipt of the segments of the depended media content part 337 and the access records 339.

In an embodiment, upon receipt of the media content part request 325, the content server 302 determines whether the media content part is one of the depended media content part according to the MPD file 307. When the content server 302 determines the media content part is one of the depended media content part, the content server 302 transmits each segment of the depended media content part 337 with the access record 339 to the client device 304. Otherwise, the content server 302 transmits the decision request 330 to the control server 302.

When the media content part is the dependent media content part, the control server 306 transmits an access record request 340 to the client device 304 for access records of the at least one depended media content part that are needed to prove the access condition for the dependent media content part is satisfied. The client device 304 transmits all stored access records 345 of the at least one depended media content part in the client device that are requested in the access record request 340 to the control server 306.

The control server 306 makes a second decision 350 based on the stored access records 345 that are received from the client device 304. When the stored access records 345 that are received from the client device 304 contain all the access records requested in the access record request 340, the access condition for the dependent media content part is satisfied. Therefore, the second decision 350 permits the dependent media content part to be accessed by the client device 304. The control server 306 then transmits the second decision 350 to the content server 302. The content server 302 transmits each segment of the dependent media content part 355 to the client device 304 in response to the second decision 350.

On the other hand, when the stored access records 345 that are received from the client device 304 do not contain all the access records requested in the access record request 340 or when no stored access record is received from the client device 304, the access condition for the dependent media content part is not satisfied. Therefore, the second decision 350 does not permit the dependent media content part to be accessed by the client device. The control server 306 then transmits the second decision 350 to the content server 302. As a result, the content server 302 will not transmit the dependent media content part to the client device 304. The content server 302, the client device 304, and the control server 306 may continue to exchange messages in a similar way as described above.

Figure 4:
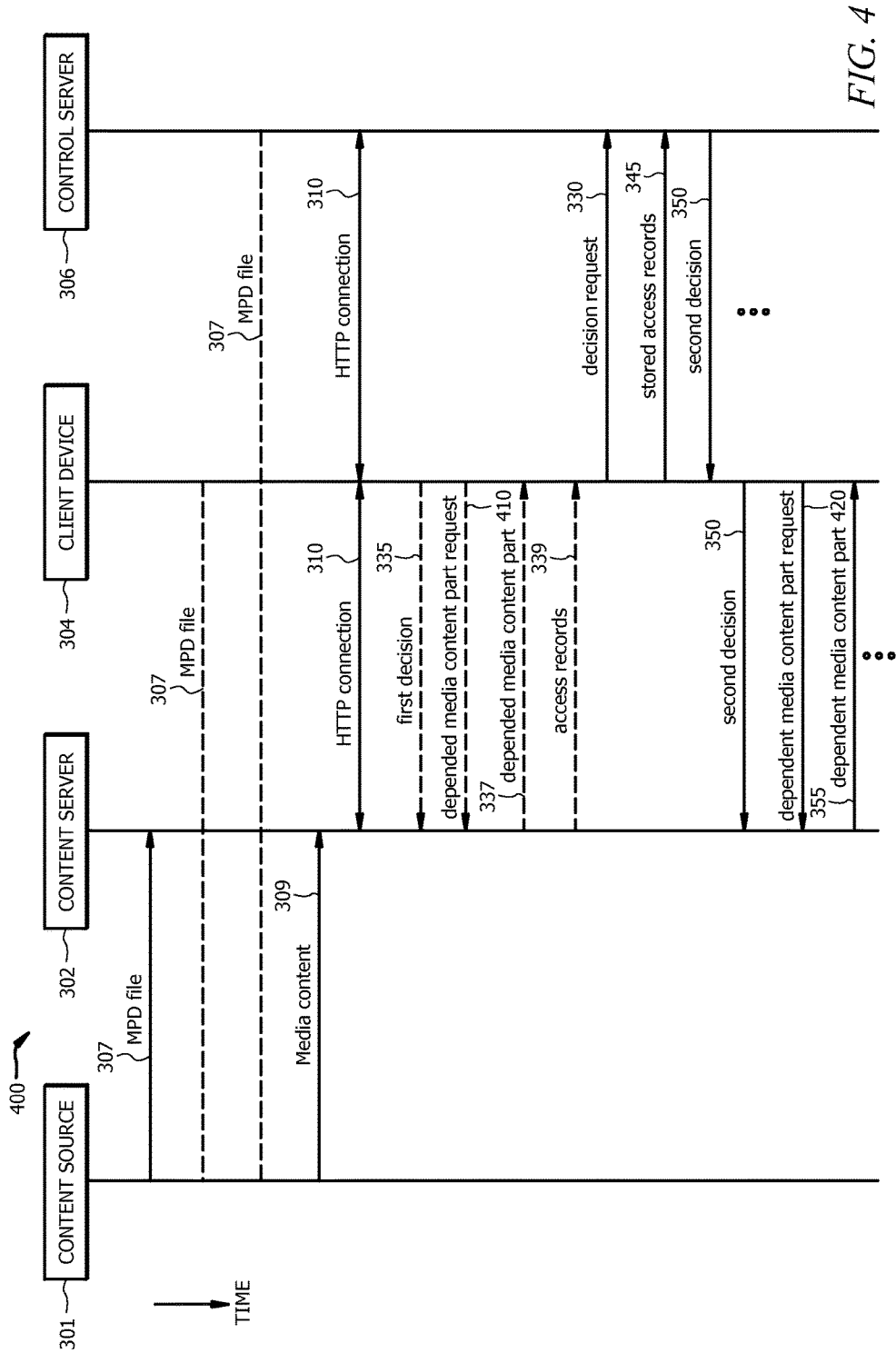
FIG. 4 is a protocol diagram illustrating client behavior control in adaptive streaming according to another embodiment of the disclosure.

FIG. 4 is a protocol diagram 400 illustrating client behavior control in adaptive streaming according to another embodiment of the disclosure. The client behavior control in adaptive streaming shown by the protocol diagram 400 is implemented when a user requests media streaming services to ensure the dependent media content part is accessed by the client device 304 (e.g., the client device 108) when the access condition for the dependent media content part is satisfied. The client behavior control in adaptive streaming may be implemented in the DASH system 100. The protocol diagram 400 illustrates message exchanges between the content source 301 (e.g, the content source 102), the content server 302 (e.g., the content server 104), the client device 304 (e.g., the client device 108), and the control server 306 (e.g., the control server 122).

Unlike the method described in the protocol diagram 300, following establishment of the connections 310 with the content server 302 and the control server 306, the client device 304 determines whether the media content part to be requested from the content server 302 is one of the at least one depended media content part according to the MPD file 307. When the client device 304 determines the media content part is one of the at least one depended media content part, the client device 304 transmits the first decision 335 to the content server 302 indicating the depended media content part is allowed to be accessed by the client device 304. The client device 304 further transmits the depended media content part request 410 to the content server 302. In response to the first decision 335 and the depended media content part request 410, the content server 302 transmits each segment of the depended media content part 337 with the access record 339 to the client device 304.

When the client device 304 determines the media content part is the dependent media content part, the client device 304 transmits the decision request 330 to the control server 306. The client device 304 further transmits all the stored access records 345 of the at least one depended media content part that are needed to judge the access condition for the dependent media content part to the control server 306.

The control server 306 makes the second decision 350 based on the stored access records 345 that are received from the client device 304. When the stored access records 345 that are received from the client device 304 contain all the access records of the at least one depended media content part that are needed to prove the access condition for the dependent media content part is satisfied, the second decision 350 permits the dependent media content part to be accessed by the client device 304. In an embodiment, the control server 306 then transmits the second decision 350 to the client device 304. Following receipt of the second decision 350, the client device 304 transmits the second decision 350 and the dependent media content part request 420 to the content server 302. The content server 302 then transmits each segment of the dependent media content part 355 to the client device 304 in response to the second decision 350 and the dependent media content part request 420. In an embodiment, the control server 306 transmits the second decision 350 to the content server 302. Following receipt of the dependent media content part request 420 from the client device 304, the control server 306 transmits the dependent media content part 355 to the client device 304.

On the other hand, when the stored access records 345 that are received from the client device 304 do not contain all the access records that are needed to prove the access condition for the dependent media content part is satisfied or when no stored access record 345 is received from the client device 304, the second decision 350 does not permit the dependent media content part to be accessed by the client device 304. The control server 306 then transmits the second decision 350 to either the client device 304 or the content server 302. As a result, the content server will not transmit the dependent media content part to the client device. The content server 302, the client device 304, and the control server 306 may continue to exchange messages in a similar way as described above.

As above, the content server 302 and the control server 306 are two separate servers. In an alternative embodiment, the functions of the content server 302 and the control server 306 are combined in a single server. This particular embodiment is favorable to eliminate message exchanges between the content server 302 and the control server 306 as described above.

Figure 5:
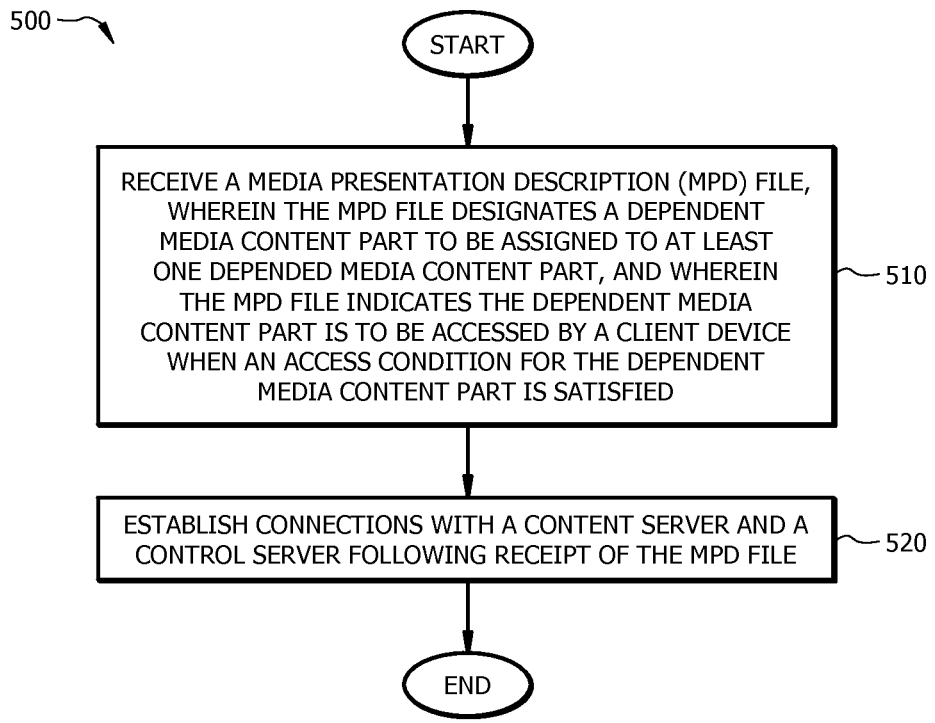
FIG. 5 is a flowchart illustrating a method for client behavior control in adaptive streaming according to an embodiment of the disclosure.

FIG. 5 is a flowchart illustrating a method 500 for client behavior control in adaptive streaming according to an embodiment of the disclosure. The method 500 is implemented in a client device (e.g., the client device 108 or the client device 304) when a user requests media streaming services to ensure that a dependent media content part is accessed by the client device when an access condition for the dependent media content part is satisfied. At step 510, a MPD file is received. In an embodiment, the MPD file is received from one of a content source (e.g., the content source 102 or the content source 301), a content server (e.g., the content server 104 or the content server 302), and a control server (e.g., the control server 122 or the control server 306). The MPD file designates a dependent media content part to be assigned to at least one depended media content part. The MPD file further indicates the dependent media content part is to be accessed by the client device when the access condition for the dependent media content part is satisfied. The access condition may have various embodiments. In one embodiment, the access condition for the dependent media content part indicates that the at least one depended media content part has been accessed by the client device before the dependent media content part is allowed to be accessed by the client device. In one embodiment, the access condition for the dependent media content part indicates that a predetermined portion of the at least one depended media content part has been accessed by the client device before the dependent media content part is allowed to be accessed by the client device. At step 520, connections are established with the content server (e.g., the content server 104 or the content server 302) and the control server (e.g., the control server 122 or the control server 306).

In an MPD file, elements and attributes may be similar to those defined in XML 1.0, Fifth Edition, 2008, which is incorporated herein by reference. The MPD file may contain descriptors that provide flexible mechanisms to annotate periods, adaptation sets, and representations. Each element may comprise one or more attributes, which may be properties that further define the element. An attribute is distinguished from an element by a proceeding '@' symbol.

TABLE 1

Semantics of an EssentialProperty/SupplementalProperty descriptor.

| Descriptor Name | Use | Description |
| --- | --- | --- |
| EssentialProperty/SupplementalProperty | | Specify a descriptor for controlled playback. |
| @schemeIdUri | M | Specify a URI to identify the scheme for controlled playback. |
| @value | O | Specify the value for the descriptor element. The value space and semantics must be defined by the owners of the scheme identified in the @schemeIdUri attribute. |
| @controllerURL | CM | It is an URL which points to the server to perform the client behavior control. It shall be present in EssentialProperty descriptor for dependent content. (It shall be present if a content part is specified in the descriptor as dependent content, e.g. in a EssentialProperty descriptor containing a ContentRange element with value of attribute @dependency equal to "dependent" or in an EssentialProperty descriptor with no Contentrange elements. |
| @id | O | Specify an identifier for the descriptor. Descriptors with identical values for this attribute shall be synonymous, i.e. the processing of one of the descriptors with an identical value is sufficient. |
| @cbc:controlType | CM default: non-strict | Specify the way how behavior is controlled and the roles of controller and client in the control process. If controlType = 'strict', pacing control is enforced. Client behavior is tracked by server using cookie. Access to the dependent content is based on the validity of the token hold by a client. If conrolType = 'non-strict', client is required to store access records returned by a content server and sent then the control server if it wants to access dependent content. It shall be present in EssentialProperty descriptor for dependent content. |
| @cbc:NumAccessRecordRequired | O | The number of Access Records that is required for verification of a client's behavior when requesting access to the dependent content. Note: It shall be present if controlType is not present, or controlType = 'non-strict'. |
| @cbc:timeMargin | O | Specify time tolerance in second a request for the subsequent segment relative to a reference time calculated as the sum of the time request for the preceding segment and the duration of the segment.. |
| cbc:ContentRange | 1 . . . N | Specify a content part consisting of one or more segments as dependent content or depended content. Access to depended content, typically advertisement, is a precondition for access to dependent content. It is of ContentRange type defined below. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

In one embodiment, semantics of a descriptor are shown above in Table 1. The descriptor is specified to a media content part, and is either an EssentialProperty descriptor or a SupplementalProperty descriptor. The descriptor may appear at most once at the levels of periods, adaptation sets, and representations.

An EssentialProperty descriptor indicates that the elements and the attributes in the EssentialProperty descriptor are needed for processing. A SupplementalProperty descriptor indicates the elements and the attributes in the SupplementalProperty descriptor may be used by a client device optimizing processing but may not be needed to implement the processing. Assume a first descriptor is specified to a dependent media content part, and a second descriptor is specified to a depended media content part. When the dependent media content part and the depended media content part are in the same period, adaptation set, or representation, both the first descriptor and the second descriptor are EssentialProperty descriptors. Otherwise, the first descriptor is the EssentialProperty descriptor, and the second descriptor is the SupplementalProperty descriptor.

Attribute "@schemeIdUri" specifies a uniform resource identifier (URI) to identify a control scheme. Particularly, the EssentialProperty or SupplementalProperty descriptor declares a client behavior control scheme when the value of the attribute "@schemeIdURI" equals to "urn:mpeg:dash:cbc:2014". Attribute "@controllerURL" specifies an HTTP URL pointing to a control server (e.g., the control server 122 or the control server 306).

Attribute "@cbc:controlType" specifies one of two types of control of the control server. When the value of the attribute "@cbc:controlType" equals to "strict," the control server determines whether each segment is to be transmitted from a content server (e.g., the content server 104 or the content server 302) to a client device (e.g., the client device 108 or the client device 304). The segment is allowed to be transmitted by the control server when the previous segment has been transmitted. On the other hand, when the value of the attribute "@cbc:controlType" equals to "non-strict," the control server determines whether a media content part (rather than each segment of the media content part) is to be transmitted from the content server to the client device when the media content part is a dependent media content part (i.e., the value of attribute "@dependency" equals to "dependent" as described in Table 2). The value of the attribute "@cbc:controlType" is "non-strict" by default.

Attribute "@cbc:NumAccessRecordRequired" specifies the number of access records required by the control server to determine whether the dependent media content part is to be transmitted to the client device. Attribute "@cbc:timeMargin" specifies an acceptable range of time in second with respect to a reference time when the segment is actually received by the client device. The reference time is defined as the time when the segment is estimated to be received by the client device. Child element, "cbc:ContentRange" will be described in future details in Table 2.

In one embodiment, semantics of an element, "ContentRange Type" (i.e., the child element, "cbc:ContentRange" in Table 1) are shown in Table 2. Similar to Table 1, the element "ContentRange Type" is specified to a media content part. The media content part comprises at least one segment.

Attribute "@dependency" designates the media content part to be one of a dependent media content part (i.e. the value of the attribute "@dependency" equals to "dependent") and a depended media content part (i.e. the value of the attribute "@dependency" equals to "depended"). When the media content part is designated as the dependent media content part, an element of "DependOnContent" should be added in Table 2, which specifies at least one depended media content part assigned to the dependent media content part.

Attribute "@period" specifies the period in which the media content part is defined in the MPD file. Attribute "@adaptationSet" specifies the adaptation set in which the media content part is defined in the MPD file. Attribute "@representation" specifies the representation in which the media content part is defined in the MPD file.

Child element, "Range" specifies a group of consecutive segments and comprises child attribute "@startNum" and child attribute "@length". The child attribute "@startNum" specifies the index number of the first segment in the group of the consecutive segments. The child attribute "@length" specifies the total number of segments in the group of the consecutive segments. Child element "SegNumList" specifies a group of non-consecutive segments.

TABLE 2

Semantics of ContentRange type.

| Element or Attribute Name | Use | Description |
| --- | --- | --- |
| ContentRange Type | | Define a subset of content in the media presentation. |
| @dependency | M | Indicate if the content part specified by the element is dependent content or depended content. As depended content (@cbc:dependency = "depended"), its access is a precondition for access to other content part in the media presentation. A content part is dependent (@cbc:dependency = "dependent") if access to which is conditional and depends on access to other content part in the media presentation, i.e. the content being depended. |
| @period | M | Specify the Period in which the described content part is contained. |
| @adaptationSet | O | Specify the AdaptationSet in which the described content part is contained. |
| @representation | O | Specify the Representation in which the described content part is contained. |
| Range | 0 . . . N | Specify a group of consecutive segments. |
| @startNum | M | Specify the segment number of the first segment for a group of consecutive segments. |

TABLE 2-continued

Semantics of ContentRange type.

| Element or Attribute Name | Use | Description |
|---|---|---|
| @length | O | Specify the number of segments contained in the group. |
| SegNumList | 0 . . . N | Specify non-consecutive segments. |

Table 3 shows an exemplary implementation of the descriptor which may be either an EssentialProperty or a SupplementalPropertydescriptor written in XML codes. One of ordinary skill in the art will understand the XML codes. The exemplary implementation in Table 3 defines the element "ContentRange" (line 5-8), the attribute "@controlType" (line 9-16), the attribute "@controllerURL" (line 17), the attribute "@NumAccessRecordRequired" (line 18), the attribute "@timeMargin" (line 19), and the attribute "@dependency" (line 36-43), respectively.

TABLE 3

An exemplary implementation of a descriptor.

```
1   <!-- Descriptor -->
2   <xs:complexType name="ClientBehaviorControlType">
3     <xs:complexContent>
4       <xs:extension name="DescriptorType">
5         <xs:sequence>
6           <xs:element name="ContentRange" type="ContentRangeType" minOccurs="1"
7   maxOccurs="unbounded"/>
8         </xs:sequence>
9         <xs:attribute name="controlType">
10          <xs:simpleType>
11            <xs:restriction base="xs:string">
12              <enumeration value="strict"/>
13              <enumeration value="non-strict"/>
14            </xs:restriction>
15          </xs:simpleType>
16        </xs:attribute>
17        <xs:attribute name="controllerURL" type="xs:anyURI"/>
18        <xs:attribute name="NumAccessRecordRequired" type="xs:unsignedInt"/>
19        <xs:attribute name="timeMargin" type="xs:unsignedInt"/>
20      </xs:extension>
21    </xs:complexContent>
22  </xs:complexType>
23  <xs:complexType name="ContentRangeType">   <xs:sequence>
24    <xs:element name="Range" minOccurs="0" maxOccurs="unbounded">
25      <xs:complexType>
26        <xs:attribute name="startNum" type="xs:unsignedInt" use="required"/>
27        <xs:attribute name="length" type="xs:unsignedInt" default=1/>
28      </xs:complexType>
29    </xs:element>
30    <xs:element name="SegNumList" minOccurs="0" maxOccurs="unbounded" >
31      <xs:simpleType>
32        <xs:list itemType="xs: unsignedInt "/>
33      </xs:simpleType>
34    </xs:element>
35    </xs:sequence>
36    <xs:attribute name="dependency" default="dependent">
37      <xs:simpleType>
38        <xs:restriction base="xs:string">
39          <enumeration value="dependent"/>
40          <enumeration value="depended"/>
41        </xs:restriction>
42      </xs:simpleType>
43    </xs:attribute>
44    <xs:attribute name="period" type=" xs:string" use="required"/>
45    <xs:attribute name="adaptationSet" type=" xs:unsignedInt" use="optional"/>
46    <xs:attribute name="representation" type="StringNoWhitespaceType" use="optional"/>
47  </xs:complexType>
```

Below are some exemplary MPD files written in the XML codes to illustrate their potential uses in some use cases. Although three exemplary use cases (use cases 1-3 and Tables 4-6) are described in this disclosure, it should be understood that these examples are non-limiting.

In use case 1, a depended media content part and a dependent media content part are defined in the same period. Table 4 shows an exemplary implementation of an MPD file in the XML codes for use case 1. Line 6 introduces a namespace of "urn:mpeg:dash:schema:cbc:2014 cbc.xsd," in which all attributes and elements are defined.

Lines 32-43 show an EssentialProperty descriptor, which describes both the depended media content part and the dependent media content part. Lines 33-36 determines the values of element "schemeIdUri," element "cdc:controllerURL," element "cbc:controlType," and element "cbc:numberAccessRecordRequired," respectively. Lines 37-39 define the dependent media content part in a period of "OnlyOne". The dependent media content part comprises 20 segments, which range from 211 to 230. Lines 40-42 define the depended media content part in the same period of "OnlyOne" as the dependent media content part. The depended media content part comprises 5 segments, which range from 205 to 209. Both the dependent media content part and the depended media content part are defined in the same adaptation set. According to line 25, the same adaptation set represents videos.

TABLE 4

An exemplary implementation of an MPD file written in XML codes.

```
1   <?xml version="1.0" encoding="UTF-8"?>
2   <MPD
3     xmlns:xsi="http://www.w3.org/2001/XMLSchema-instance"
4     xmlns="urn:mpeg:dash:schema:mpd:2011"
5     xsi:schemaLocation="urn:mpeg:dash:schema:mpd:2011 DASH-MPD.xsd"
6     xmlns:cbc="urn:mpeg:dash:schema:cbc:2014 cbc.xsd"
7     type="dynamic"
8     minimumUpdatePeriod="PT2S"
9     timeShiftBufferDepth="PT30M"
10    availabilityStartTime="2011-12-25T12:30:00"
11    minBufferTime="PT4S"
12    profiles="urn:mpeg:dash:profile:isoff-live:2011">
13
14    <BaseURL>http://cdn1.example.com/</BaseURL>
15    <BaseURL>http://cdn2.example.com/</BaseURL>
16
17    <Period id="OnlyOne">
18    <!-- Video -->
19    <AdaptationSet
20      mimeType="video/mp4"
21      codecs="avc1.4D401F"
22      frameRate="30000/1001"
23      segmentAlignment="true"
24      startWithSAP="1">
25      <BaseURL>video/</BaseURL>
26      <SegmentTemplate timescale="90000" initialization="$Bandwidth%/init.mp4v"
27    media="$Bandwidth%/$Time$.mp4v">
28        <SegmentTimeline>
29        <S t="0" d="180180" r="432"/>
30        </SegmentTimeline>
31      </SegmentTemplate>
32      <EssentialProperty
33        schemeIdUri="urn:mpeg:dash:cbc:2014"
34        cbc:controllerURL="http://auth.example.com/"
35        cbc:controlType="non-strict"
36        cbc:numberAccessRecordRequired="5">
37        <cbc:ContentRange dependency="dependent" period="OnlyOne" >
38          <Range startNum="211" length="20" />
39        </cbc:ContentRange>
40        <cbc:ContentRange dependency="depended" period="OnlyOne" >
41          <Range startNum="205" length="5" />
42        </cbc:ContentRange>
43      </EssentialProperty>
44      <Representation id="v0" width="320" height="240" bandwidth="250000"/>
45      <Representation id="v1" width="640" height="480" bandwidth="500000"/>
46      <Representation id="v2" width="960" height="720" bandwidth="1000000"/>
47    </AdaptationSet>
48    <!-- English Audio -->
49    <AdaptationSet mimeType="audio/mp4" codecs="mp4a.40" lang="en" segmentAlignment="0"
50  startWithSAP="1">
51      <SegmentTemplate timescale="48000" initialization="audio/en/init.mp4a"
52  media="audio/en/$Time$.mp4a">
53        <SegmentTimeline>
54        <S t="0" d="96000" r="432"/>
55        </SegmentTimeline>
56      </SegmentTemplate>
57      <Representation id="a0" bandwidth="64000" />
58    </AdaptationSet>
59    <!-- French Audio -->
60    <AdaptationSet mimeType="audio/mp4" codecs="mp4a.40" lang="fr" segmentAlignment="0"
```

TABLE 4-continued

An exemplary implementation of an MPD file written in XML codes.

```
61    startWithSAP="1">
62      <SegmentTemplate timescale="48000" initialization="audio/fr/init.mp4a"
63    media="audio/fr/$Time$.mp4a">
64      <SegmentTimeline>
65        <S t="0" d="96000" r="432"/>
66      </SegmentTimeline>
67      </SegmentTemplate>
68      <Representation id="a0" bandwidth="64000" />
69    </AdaptationSet>
70   </Period>
71  </MPD>
```

In use case 2, a depended media content part and a dependent media content part are defined in different periods. Table 5 shows an exemplary implementation of an MPD file in the XML codes for use case 2. Line 6 introduces a namespace of "urn:mpeg:dash:schema:cbc:2014 cbc.xsd," in which all attributes and elements are defined.

Lines 46-49 show a SupplementalProperty descriptor, which describes the depended media content part. Line 47 determines the value of element "schemeIdUri". Line 48 shows the depended media content part is defined in the period of "42".

Lines 75-81 show an EssentialProperty descriptor, which describes the dependent media content part. Lines 76-78 determine the value of element "schemeIdUri," element "cbc:controllerURL," and element "cbc:controlType" respectively. Lines 79-80 show the dependent media content part is defined in the period of "43," and is assigned to the depended media content part in the period of "43," which is defined in lines 46-49.

In use case 3, a first dependent media content part is assigned to a first depended media content part. The first dependent media content part and the first depended media content part are defined in different periods. Similarly, a second dependent media content part is assigned to a second depended media content part. The second dependent media content part and the second depended media content part are defined in different periods. Table 6 shows an exemplary implementation of an MPD file written in the XML codes for use case 3.

Lines 48-51 show a first SupplementalProperty descriptor, which describes the first depended media content part. Line 49 determines the value of element "schemeIdUri". Line 50 shows the first depended media content part is in the period of "ad1".

Lines 78-84 show a first EssentialProperty descriptor, which describes the first dependent media content part. Lines 79-81 determine the value of element "schemeIdUri," element "cbc:controllerURL," and element "cbc:controlType," respectively. Lines 82-83 show the first dependent media content part is defined in the period of "43," and is assigned to the first depended media content part in the period of "ad1," which is defined in lines 48-51.

Lines 115-118 show a second SupplementalProperty descriptor, which describes the second depended media content part. Line 116 determines the value of element "schemeIdUri". Line 117 shows the second depended media content part is defined in the period of "ad2".

Lines 144-158 show a second EssentialProperty descriptor, which describes the second dependent media content part. Lines 145-148 determine the value of element "schemeIdUri," element "cbc:controllerURL," and element "cbc:controlType," respectively. Lines 149-150 show the second dependent media content part is defined in the period of "45," and is assigned to the second depended media content part in the period of "ad2," which is defined in lines 115-118.

TABLE 5

An exemplary implementation of another MPD file in the XML codes.

```
1    <?xml version="1.0" encoding="UTF-8"?>
2    <MPD
3      xmlns:xsi="http://www.w3.org/2001/XMLSchema-instance"
4      xmlns="urn:mpeg:dash:schema:mpd:2011"
5      xsi:schemaLocation="urn:mpeg:dash:schema:mpd:2011 DASH-MPD.xsd"
6      xmlns:cbc=" urn:mpeg:dash:schema:cbc:2014 cbc.xsd"
7      type="static"
8      mediaPresentationDuration="PT1605S"
9      availabilityStartTime="2011-05-10T06:16:42"
10     minBufferTime="PT1.4S"
11     profiles="urn:mpeg:dash:profile:mp2t-simple:2011"
12     maxSegmentDuration="PT4S">
13
14     <BaseURL>http://cdn1.example.com/</BaseURL>
15     <BaseURL>http://cdn2.example.com/</BaseURL>
16
17     <Period id="41" duration="PT630S">
18       <AdaptationSet
19       mimeType="video/mp2t"
20       codecs="avc1.4D401F,mp4a"
21       frameRate="24000/1001"
22       segmentAlignment="true"
23       subsegmentAlignment="true"
24       bitstreamSwitching="true"
```

TABLE 5-continued

An exemplary implementation of another MPD file in the XML codes.

| | |
|---|---|
| 25 | startWithSAP="2" |
| 26 | subsegmentStartsWithSAP="2"> |
| 27 | <ContentComponent contentType="video" id="481"/> |
| 28 | <ContentComponent contentType="audio" id="482" lang="en"/> |
| 29 | <ContentComponent contentType="audio" id="483" lang="es"/> |
| 30 | <BaseURL>SomeMovie/</BaseURL> |
| 31 | <SegmentTemplate |
| 32 | media="$RepresentationID$_$Number%05d$.ts" |
| 33 | index="$RepresentationID$.sidx" |
| 34 | initialization="$RepresentationID$-init.ts" |
| 35 | bitstreamSwitching="$RepresentationID$-bssw.ts" |
| 36 | duration="4"/> |
| 37 | <Representation id="720kbps" bandwidth="792000" width="640" height="368"/> |
| 38 | <Representation id="1130kbps" bandwidth="1243000" width="704" height="400"/> |
| 39 | <Representation id="1400kbps" bandwidth="1540000" width="960" height="544"/> |
| 40 | <Representation id="2100kbps" bandwidth="2310000" width="1120" height="640"/> |
| 41 | <Representation id="2700kbps" bandwidth="2970000" width="1280" height="720"/> |
| 42 | <Representation id="3400kbps" bandwidth="3740000" width="1280" height="720"/> |
| 43 | </AdaptationSet> |
| 44 | </Period> |
| 45 | <Period id="42" duration="PT15S"> |
| 46 | <SupplementalProperty |
| 47 | schemeIdUri="urn:mpeg:dash:cbc:2014" |
| 48 | <cbc:ContentRange dependency="depended" period="42" /> |
| 49 | </SupplementalProperty> |
| 50 | <AdaptationSet |
| 51 | mimeType="video/mp2t" |
| 52 | codecs="avc1.4D401F,mp4a" |
| 53 | frameRate="24000/1001" |
| 54 | segmentAlignment="true" |
| 55 | subsegmentAlignment="true" |
| 56 | bitstreamSwitching="true" |
| 57 | startWithSAP="2" |
| 58 | subsegmentStartsWithSAP="2"> |
| 59 | <ContentComponent contentType="video" id="481"/> |
| 60 | <ContentComponent contentType="audio" id="482" lang="en"/> |
| 61 | <BaseURL>Ad/</BaseURL> |
| 62 | <SegmentTemplate |
| 63 | media="$RepresentationID$_$Number%05d$.ts" |
| 64 | index="$RepresentationID$.sidx" |
| 65 | initialization="$RepresentationID$-init.ts" |
| 66 | bitstreamSwitching="$RepresentationID$-bssw.ts" |
| 67 | duration="5"/> |
| 68 | <Representation id="720kbps" bandwidth="792000" width="640" height="368"/> |
| 69 | <Representation id="1130kbps" bandwidth="1243000" width="704" height="400"/> |
| 70 | <Representation id="1400kbps" bandwidth="1540000" width="960" height="544"/> |
| 71 | <Representation id="2100kbps" bandwidth="2310000" width="1120" height="640"/> |
| 72 | </AdaptationSet> |
| 73 | </Period> |
| 74 | <Period id="43" duration="PT960S"> |
| 75 | <EssentialProperty |
| 76 | schemeIdUri="urn:mpeg:dash:cbc:2014" |
| 77 | cbc:controllerURL=" http://auth.example.com/" |
| 78 | cbc:controlType="strict" timeMargin="2"> |
| 79 | <cbc:ContentRange dependency="dependent" period="43" /> |
| 80 | <cbc:ContentRange dependency="depended" period="42" /> |
| 81 | </EssentialProperty> |
| 82 | <AdaptationSet |
| 83 | mimeType="video/mp2t" |
| 84 | codecs="avc1.4D401F,mp4a" |
| 85 | frameRate="24000/1001" |
| 86 | segmentAlignment="true" |
| 87 | subsegmentAlignment="true" |
| 88 | bitstreamSwitching="true" |
| 89 | startWithSAP="2" |
| 90 | subsegmentStartsWithSAP="2"> |
| 91 | <ContentComponent contentType="video" id="481"/> |
| 92 | <ContentComponent contentType="audio" id="482" lang="en"/> |
| 93 | <ContentComponent contentType="audio" id="483" lang="es"/> |
| 94 | <BaseURL>SomeMovie/</BaseURL> |
| 95 | <SegmentTemplate |
| 96 | media="$RepresentationID$_$Number%05d$.ts" |
| 97 | index="$RepresentationID$.sidx" |
| 98 | initialization="$RepresentationID$-init.ts" |
| 99 | bitstreamSwitching="$RepresentationID$-bssw.ts" |
| 100 | duration="4"/> |
| 101 | <Representation id="720kbps" bandwidth="792000" width="640" height="368"/> |
| 102 | <Representation id="1130kbps" bandwidth="1243000" width="704" height="400"/> |

TABLE 5-continued

An exemplary implementation of another MPD file in the XML codes.

| | |
|---|---|
| 103 |       <Representation id="1400kbps" bandwidth="1540000" width="960" height="544"/> |
| 104 |       <Representation id="2100kbps" bandwidth="2310000" width="1120" height="640"/> |
| 105 |       <Representation id="2700kbps" bandwidth="2970000" width="1280" height="720"/> |
| 106 |       <Representation id="3400kbps" bandwidth="3740000" width="1280" height="720"/> |
| 107 |     </AdaptationSet> |
| 108 |   </Period> |
| 109 | |
| 110 | </MPD> |

TABLE 6

An exemplary implementation of yet another MPD file written in the XML codes.

| | |
|---|---|
| 1 | ?xml version="1.0" encoding="UTF-8"?> |
| 2 | <MPD |
| 3 | s:xsi="http://www.w3.org/2001/XMLSchema-instance" |
| 4 | xmlns="urn:mpeg:dash:schema:mpd:2011" |
| 5 | xsi:schemaLocation="urn:mpeg:dash:schema:mpd:2011 DASH-MPD.xsd" |
| 6 | xmlns:cbc="urn:mpeg:dash:schema:cbc:2014 cbc.xsd" |
| 7 | type="static" |
| 8 | mediaPresentationDuration="PT1980S" |
| 9 | availabilityStartTime="2011-05-10T06:16:42" |
| 10 | minBufferTime="PT1.4S" |
| 11 | profiles="urn:mpeg:dash:profile:mp2t-simple:2011" |
| 12 | maxSegmentDuration="PT4S"> |
| 13 | |
| 14 |   <BaseURL>http://cdn1.example.com/</BaseURL> |
| 15 |   <BaseURL>http://cdn2.example.com/</BaseURL> |
| 16 | |
| 17 |   <Period id="m0" duration="PT628S"> |
| 18 |     <AdaptationSet |
| 19 |     mimeType="video/mp2t" |
| 20 |     codecs="avc1.4D401F,mp4a" |
| 21 |     frameRate="24000/1001" |
| 22 |     segmentAlignment="true" |
| 23 |     subsegmentAlignment="true" |
| 24 |     bitstreamSwitching="true" |
| 25 |     startWithSAP="2" |
| 26 |     subsegmentStartsWithSAP="2"> |
| 27 |       <ContentComponent contentType="video" id="481"/> |
| 28 |       <ContentComponent contentType="audio" id="482" lang="en"/> |
| 29 |       <ContentComponent contentType="audio" id="483" lang="es"/> |
| 30 |     <BaseURL>SomeMovie/</BaseURL> |
| 31 |     <SegmentTemplate |
| 32 |     media="$RepresentationID$_$Number%05d$.ts" |
| 33 |     index="$RepresentationID$.sidx" |
| 34 |     initialization="$RepresentationID$-init.ts" |
| 35 |     bitstreamSwitching="$RepresentationID$-bssw.ts" |
| 36 |     duration="4" |
| 37 |     startNumber="1"/> |
| 38 |       <Representation id="720kbps" bandwidth="792000" width="640" height="368"/> |
| 39 |       <Representation id="1130kbps" bandwidth="1243000" width="704" height="400"/> |
| 40 |       <Representation id="1400kbps" bandwidth="1540000" width="960" height="544"/> |
| 41 |       <Representation id="2100kbps" bandwidth="2310000" width="1120" height="640"/> |
| 42 |       <Representation id="2700kbps" bandwidth="2970000" width="1280" height="720"/> |
| 43 |       <Representation id="3400kbps" bandwidth="3740000" width="1280" height="720"/> |
| 44 |     </AdaptationSet> |
| 45 |   </Period> |
| 46 | |
| 47 |   <Period id="ad1" duration="PT15S"> |
| 48 |     <SupplementalProperty |
| 49 |     schemeIdUri="urn:mpeg:dash:cbc:2014" |
| 50 |     <cbc:ContentRange dependency="depended" period="ad1" /> |
| 51 |     </SupplementalProperty> |
| 52 |     <AdaptationSet |
| 53 |     mimeType="video/mp2t" |
| 54 |     codecs="avc1.4D401F,mp4a" |
| 55 |     frameRate="24000/1001" |
| 56 |     segmentAlignment="true" |
| 57 |     subsegmentAlignment="true" |
| 58 |     bitstreamSwitching="true" |
| 59 |     startWithSAP="2" |
| 60 |     subsegmentStartsWithSAP="2"> |
| 61 |       <ContentComponent contentType="video" id="481"/> |
| 62 |       <ContentComponent contentType="audio" id="482" lang="en"/> |

TABLE 6-continued

An exemplary implementation of yet another MPD file written in the XML codes.

```
63       <BaseURL>AD/COM1/</BaseURL>
64       <SegmentTemplate
65        media="$RepresentationID$_$Number%05d$.ts"
66        index="$RepresentationID$.sidx"
67        initialization="$RepresentationID$-init.ts"
68        bitstreamSwitching="$RepresentationID$-bssw.ts"
69        duration="5"/>
70       <Representation id="720kbps" bandwidth="792000" width="640" height="368"/>
71       <Representation id="1130kbps" bandwidth="1243000" width="704" height="400"/>
72       <Representation id="1400kbps" bandwidth="1540000" width="960" height="544"/>
73       <Representation id="2100kbps" bandwidth="2310000" width="1120" height="640"/>
74      </AdaptationSet>
75     </Period>
76
77     <Period id="m1" duration="PT620S">
78      <EssentialProperty
79       schemeIdUri="urn:mpeg:dash:cbc:2014"
80       cbc:controllerURL=" http://auth.example.com/"
81       cbc:controlType="strict" timeMargin="2">
82       <cbc:ContentRange dependency="dependent" period="43" />
83       <cbc:ContentRange dependency="depended" period="ad1" />
84      </EssentialProperty>
85      <AdaptationSet
86       mimeType="video/mp2t"
87       codecs="avc1.4D401F,mp4a"
88       frameRate="24000/1001"
89       segmentAlignment="true"
90       subsegmentAlignment="true"
91       bitstreamSwitching="true"
92       startWithSAP="2"
93       subsegmentStartsWithSAP="2">
94       <ContentComponent contentType="video" id="481"/>
95       <ContentComponent contentType="audio" id="482" lang="en"/>
96       <ContentComponent contentType="audio" id="483" lang="es"/>
97       <BaseURL>SomeMovie/</BaseURL>
98       <SegmentTemplate
99        media="$RepresentationID$_$Number%05d$.ts"
100       index="$RepresentationID$.sidx"
101       initialization="$RepresentationID$-init.ts"
102       bitstreamSwitching="$RepresentationID$-bssw.ts"
103       duration="4"
104       startNumber="158"/>
105      <Representation id="720kbps" bandwidth="792000" width="640" height="368"/>
106      <Representation id="1130kbps" bandwidth="1243000" width="704" height="400"/>
107      <Representation id="1400kbps" bandwidth="1540000" width="960" height="544"/>
108      <Representation id="2100kbps" bandwidth="2310000" width="1120" height="640"/>
109      <Representation id="2700kbps" bandwidth="2970000" width="1280" height="720"/>
110      <Representation id="3400kbps" bandwidth="3740000" width="1280" height="720"/>
111     </AdaptationSet>
112    </Period>
113
114    <Period id="ad2" duration="PT15S">
115     <SupplementalProperty
116      schemeIdUri="urn:mpeg:dash:cbc:2014"
117      <cbc:ContentRange dependency="depended" period="ad2" />
118     </SupplementalProperty>
119     <AdaptationSet
120      mimeType="video/mp2t"
121      codecs="avc1.4D401F,mp4a"
122      frameRate="24000/1001"
123      segmentAlignment="true"
124      subsegmentAlignment="true"
125      bitstreamSwitching="true"
126      startWithSAP="2"
127      subsegmentStartsWithSAP="2">
128      <ContentComponent contentType="video" id="481"/>
129      <ContentComponent contentType="audio" id="482" lang="en"/>
130      <BaseURL>AD/COM2/</BaseURL>
131      <SegmentTemplate
132       media="$RepresentationID$_$Number%05d$.ts"
133       index="$RepresentationID$.sidx"
134       initialization="$RepresentationID$-init.ts"
135       bitstreamSwitching="$RepresentationID$-bssw.ts"
136       duration="5"/>
137      <Representation id="1130kbps" bandwidth="1243000" width="704" height="400"/>
138      <Representation id="1400kbps" bandwidth="1540000" width="960" height="544"/>
139      <Representation id="2100kbps" bandwidth="2310000" width="1120" height="640"/>
140     </AdaptationSet>
```

TABLE 6-continued

An exemplary implementation of yet another MPD file written in the XML codes.

```
141       </Period>
142
143       <Period id="m2" duration="PT700S">
144         <EssentialProperty
145         schemeIdUri="urn:mpeg:dash:cbc:2014"
146         cbc:controllerURL=" http://auth.example.com/"
147         cbc:controlType="strict"
148         cbc:timeMargin="2">
149         <cbc:ContentRange dependency="dependent" period="45" />
150         <cbc:ContentRange dependency="depended" period="ad2" />
151         </EssentialProperty>
152         <AdaptationSet
153         mimeType="video/mp2t"
154         codecs="avc1.4D401F,mp4a"
155         frameRate="24000/1001"
156         segmentAlignment="true"
157         subsegmentAlignment="true"
158         bitstreamSwitching="true"
159         startWithSAP="2"
160         subsegmentStartsWithSAP="2">
161         <ContentComponent contentType="video" id="481"/>
162         <ContentComponent contentType="audio" id="482" lang="en"/>
163         <ContentComponent contentType="audio" id="483" lang="es"/>
164         <BaseURL>SomeMovie/</BaseURL>
165         <SegmentTemplate
166         media="$RepresentationID$_$Number%05d$.ts"
167         index="$RepresentationID$.sidx"
168         initialization="$RepresentationID$-init.ts"
169         bitstreamSwitching="$RepresentationID$-bssw.ts"
170         duration="4"
171         startNumber="313"/>
172         <Representation id="720kbps" bandwidth="792000" width="640" height="368"/>
173         <Representation id="1130kbps" bandwidth="1243000" width="704" height="400"/>
174         <Representation id="1400kbps" bandwidth="1540000" width="960" height="544"/>
175         <Representation id="2100kbps" bandwidth="2310000" width="1120" height="640"/>
176         <Representation id="2700kbps" bandwidth="2970000" width="1280" height="720"/>
177         <Representation id="3400kbps" bandwidth="3740000" width="1280" height="720"/>
178         </AdaptationSet>
179       </Period>
180
181       </MPD>
```

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A content source comprising:
a processor configured to generate a media presentation description (MPD) file, wherein the MPD file designates a dependent media content part to be assigned to at least one depended media content part, wherein the MPD file indicates the dependent media content part is to be accessed by a client device when an access condition for the dependent media content part is satisfied, wherein the access condition is satisfied when the client device has transmitted access records that were received from a content server to a control server, and wherein each segment of the depended media content part was transmitted by the content server to the client device along with one of the access records, wherein the access records are configured to be stored by the client device for subsequent transmission to the control server in response to an access record request; and
a transmitter operably coupled to the processor and configured to transmit the MPD file to at least one of a content server, a control server, and the client device.

2. The content source of claim 1, wherein the transmitter is further configured to transmit the dependent media content part and the at least one depended media content part to the content server.

3. The content source of claim 2, wherein the access condition for the dependent media content part indicates that the at least one depended media content part has been accessed by the client device.

4. The content source of claim 2, wherein the access condition for the dependent media content part indicates that a predetermined portion of the at least one depended media content part has been accessed by the client device, and wherein the MPD file designates the predetermined portion of the at least one depended media content part.

5. A control server comprising:
a receiver configured to receive:
  a media presentation description (MPD) file from one of a content source, a content server, and a client device, wherein the MPD file designates a dependent media content part to be assigned to at least one depended media content part, and wherein the MPD file indicates the dependent media content part is to be accessed by the client device when an access condition for the dependent media content part is satisfied;
  a decision request from one of the content server and the client device via a hypertext transfer protocol (HTTP) connection; and
  at least one access record from the client device, wherein the at least one access record was generated by the content server, transmitted to the client device along with a segment of the depended media content part, and stored by the client device for subsequent transmission to the control server in response to an access record request; and
a processor operably coupled to the receiver, wherein the processor is configured to make a decision on whether the dependent media content part may be accessed by and displayed on a display of the client device based on the MPD file, the decision request, and the at least one access record after receipt of the MPD file, the decision request, and the at least one access record.

6. The control server of claim 5, wherein the processor is configured to transmit the decision to one of the content server and the client device after making the decision.

7. The control server of claim 6, wherein the decision permits the dependent media content part to be accessed by the client device when the MPD file, the decision request, and the at least one access record indicate that the access condition for the dependent media content part is satisfied, and wherein the decision does not permit the dependent media content part to be accessed by the client device when the MPD file, the decision request, and the at least one access record indicate that the access condition for the dependent media content part is not satisfied.

8. The control server of claim 7, wherein the access condition for the dependent media content part indicates that the at least one depended media content part has been accessed by the client device.

9. The control server of claim 7, wherein the access condition for the dependent media content part indicates that a predetermined portion of the at least one depended media content part has been accessed by the client device, and wherein the MPD file designates the predetermined portion of the at least one depended media content part.

10. A method implemented by a client device for controlling client behavior in adaptive streaming, the method comprising:
receiving a media presentation description (MPD) file, wherein the MPD file designates a dependent media content part to be assigned to at least one depended media content part, and wherein the MPD file indicates the dependent media content part is to be accessed by the client device when an access condition for the dependent media content part is satisfied;
establishing connections with a content server and a control server following receipt of the MPD file;
receiving, from the content server, each segment of the depended media content along with an access record;
storing the access record for subsequent transmission to the control server in response to an access record request;
transmitting the access record received from the content server to the control server to satisfy the access condition; and
displaying, on a display of the client device, segments of the dependent media content part after the access condition has been satisfied.

11. The method of claim 10, wherein each of the dependent media content part and the at least one depended media content part comprises at least one segment.

12. The method of claim 11, wherein the access condition for the dependent media content part indicates that the at least one depended media content part has been accessed by the client device.

13. The method of claim 11, wherein the access condition for the dependent media content part indicates that a predetermined portion of the at least one depended media content part has been accessed by the client device, and wherein the MPD file designates the predetermined portion of the at least one depended media content part.

14. The method of claim 11, further comprising transmitting at least one access record of the at least one depended media content part to the control server following establishment of the connections with the content server and the control server.

15. The method of claim 14, further comprising:
transmitting a dependent media content part request to the content server following transmission of the at least one access record of the at least one depended media content part; and
receiving the at least one segment of the dependent media content part from the content server following transmission of the dependent media content part request.

16. The method of claim 14, further comprising:
receiving a decision from the control server following transmission of the at least one access record of the at least one depended media content part, wherein the decision indicates whether the dependent media content part is allowed to be accessed by the client device;
transmitting the decision and a dependent media content part request to the content server following receipt of the decision from the control server; and
receiving the at least one segment of the dependent media content part from the content server following transmission of the decision and the dependent media content part request when the decision permits the dependent media content part to be accessed by the client device.

17. The method of claim 11, further comprising:
transmitting a depended media content part request to the content server following establishment of the connections with the content server and the control server; and
receiving each segment of one of the at least one depended media content part with an access record of the one of the at least one depended media content part from the content server following transmission of the depended media content part request to the content server.

18. The method of claim 11, further comprising:
transmitting a dependent media content part request to the content server following establishment of the connections with the content server and the control server;

receiving the access record request from the control server following transmission of the dependent media content part request;

transmitting at least one access record of the at least one depended media content part to the control server in response to the access record request; and receiving the at least one segment of the dependent media content part from the content server following transmission of the at least one access record.

19. The method of claim 18, wherein receiving the at least one segment of the dependent media content part from the content server comprises receiving the at least one segment of the dependent media content part from the content server via a dynamic adaptive streaming over hypertext transfer (DASH) protocol.

* * * * *